US009490950B2

(12) United States Patent
Chung et al.

(10) Patent No.: US 9,490,950 B2
(45) Date of Patent: *Nov. 8, 2016

(54) METHOD FOR TRANSMITTING REFERENCE SIGNAL FOR TERMINAL DEMODULATION IN RADIO MOBILE COMMUNICATION SYSTEM, AND APPARATUS FOR IMPLEMENTING THE SAME

(71) Applicant: LG ELECTRONICS INC., Seoul (KR)

(72) Inventors: Jae Hoon Chung, Gyeonggi-do (KR); Hyun Soo Ko, Gyeonggi-do (KR); Seung Hee Han, Gyeonggi-do (KR); Moon Il Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,429

(22) Filed: Feb. 8, 2016

(65) Prior Publication Data

US 2016/0156446 A1 Jun. 2, 2016

Related U.S. Application Data

(63) Continuation of application No. 14/617,913, filed on Feb. 9, 2015, now Pat. No. 9,270,432, which is a continuation of application No. 13/148,063, filed as application No. PCT/KR2010/000759 on Feb. 8, 2010, now Pat. No. 8,982,865.

(Continued)

(51) Int. Cl.
*H04L 5/00* (2006.01)
*H04L 25/02* (2006.01)
(Continued)

(52) U.S. Cl.
CPC ........... *H04L 5/0051* (2013.01); *H04L 5/0007* (2013.01); *H04L 5/0023* (2013.01);
(Continued)

(58) Field of Classification Search
CPC ............. H04L 5/0048; H04L 27/2613; H04L 5/0016; H04L 27/2602
USPC ................................................. 370/295, 342
See application file for complete search history.

(56) References Cited

U.S. PATENT DOCUMENTS

| 7,336,738 | B2 | 2/2008 | Wakamatsu |
| 2002/0027952 | A1 | 3/2002 | Kokuryo et al. |

(Continued)

FOREIGN PATENT DOCUMENTS

| CN | 101340228 A | 1/2008 |
| CN | 101176277 A | 5/2008 |

(Continued)

OTHER PUBLICATIONS

Office Action dated Aug. 1, 2014, issued by the State Intellectual Property Office of China in Chinese Patent Application No. 201080007015.0.

(Continued)

*Primary Examiner* — Jae Y Lee
*Assistant Examiner* — Jean F Voltaire
(74) *Attorney, Agent, or Firm* — Morgan, Lewis & Bockius LLP

(57) ABSTRACT

The present invention relates to a method for transmitting a data demodulation reference signal in a radio mobile communication system. The method comprises: a step for generating a sub-frame including the data demodulation reference signal, and a step for transmitting the generated sub-frame. The 1st and 2nd demodulation reference signal pattern groups include plural demodulation signal patterns orthogonal to each other, and are differentiated from each other with regard to time-frequency resources. In the data demodulation reference signal, demodulation reference signal patterns which are respectively orthogonal to each other M (M≤N) and N-M times are respectively included in the 1st and 2nd demodulation reference signal pattern groups if the rank is N.

12 Claims, 24 Drawing Sheets

Related U.S. Application Data

(60) Provisional application No. 61/163,876, filed on Mar. 27, 2009, provisional application No. 61/163,055, filed on Mar. 25, 2009, provisional application No. 61/150,784, filed on Feb. 8, 2009.

(51) Int. Cl.
*H04W 72/04* (2009.01)
*H04J 11/00* (2006.01)
*H04L 27/26* (2006.01)

(52) U.S. Cl.
CPC ........... *H04L5/0048* (2013.01); *H04L 5/0053* (2013.01); *H04L 5/0091* (2013.01); *H04L 25/0226* (2013.01); *H04L 27/2601* (2013.01); *H04L 27/2613* (2013.01); *H04W 72/042* (2013.01); *H04W 72/0446* (2013.01); *H04J 11/0069* (2013.01); *H04L 5/0016* (2013.01); *H04L 27/2602* (2013.01); *H04L 27/2607* (2013.01); *H04L 27/2662* (2013.01)

(56) References Cited

U.S. PATENT DOCUMENTS

| | | | |
|---|---|---|---|
| 2007/0274415 | A9 | 11/2007 | Brown |
| 2008/0318608 | A1 | 12/2008 | Inoue et al. |
| 2009/0135803 | A1* | 5/2009 | Luo ........................ H04L 5/0007 370/350 |
| 2010/0074343 | A1* | 3/2010 | Gaal ...................... H04L 27/261 375/259 |
| 2010/0172316 | A1 | 7/2010 | Hwang et al. |
| 2010/0195566 | A1* | 8/2010 | Krishnamurthy ..... H04L 5/0007 370/328 |
| 2010/0195748 | A1* | 8/2010 | Nam .................... H04J 11/0069 375/260 |

FOREIGN PATENT DOCUMENTS

| | | |
|---|---|---|
| CN | 101330321 A | 12/2008 |
| CN | 101340227 A | 1/2009 |
| WO | 2007/142393 A1 | 12/2007 |

OTHER PUBLICATIONS

3GPP TS 36211 v.8.2.0 (Mar. 2008), 3rd Generation Partnership Project; Technical Specification Group Radio Access Network; Evolved Universal Terrestrial Radio Access (E-UTRA); Physical Channels and Modulation (Release 8), pp. 1-65, Mar. 31, 2008.
International Search Report dated Oct. 6, 2010, for corresponding International Application No. PCT/KR2010/000759.
3GPP-NTT DOCOMO, Downlink DM-RS Structure for Rank 5-8 in LTE-Advanced, dated Nov. 13, 2009, vol. 59.

\* cited by examiner

Normal CP case

Extended CP case

▧ DRS pattern group #0

☰ DRS pattern group #1

Normal CP case

Extended CP case

▧ DRS pattern group #0

▥ DRS pattern group #1

Normal CP case

▨ DRS pattern group #0

▥ DRS pattern group #1

Normal CP case

Extended CP case

◨ DRS pattern group #0

▥ DRS pattern group #1

Normal CP case

Extended CP case

DRS pattern group #0

DRS pattern group #1

Normal CP case

Extended CP case

◺ DRS pattern group #0

▥ DRS pattern group #1

METHOD FOR TRANSMITTING REFERENCE SIGNAL FOR TERMINAL DEMODULATION IN RADIO MOBILE COMMUNICATION SYSTEM, AND APPARATUS FOR IMPLEMENTING THE SAME

CROSS REFERENCE TO RELATED APPLICATIONS

The present application is a continuation of U.S. patent application Ser. No. 14/617,913, filed on Feb. 9, 2015, which is a continuation of U.S. patent application Ser. No. 13/148,063, filed on Aug. 5, 2011, the entire disclosure of each which is hereby incorporated by reference for all purposes as if fully set forth herein. U.S. patent application Ser. No. 13/148,063 is a U.S. National Stage Entry of PCT International Application No. PCT/KR10/00759, filed on Feb. 8, 2010, and claims the benefit of U.S. Provisional Applications No. 61/163,876, filed on Mar. 27, 2009; No. 61/163,055, filed on Mar. 25, 2009; and No. 61/150,784, filed on Feb. 8, 2009.

TECHNICAL FIELD

The present invention relates to a method for transmitting a reference signal for user equipment demodulation and an apparatus for implementing the same in a radio mobile communication system.

BACKGROUND ART

LTE Physical Structure $3^{rd}$ Generation Project Partnership (3GPP) Long Term Evolution (LTE) supports a type 1 radio frame structure, which is applicable to Frequency Division Duplex (FDD), and a type 2 radio frame structure, which is applicable to Time Division Duplex (TDD).

FIG. 1 shows the structure of a type 1 radio frame. The type 1 radio frame includes 10 subframes, each of which consists of two slots.

FIG. 2 shows the structure of a type 2 radio frame. The type 2 radio frame includes two half-frames, each of which is composed of five subframes, a Downlink Pilot Time Slot (DwPTS), a Guard Period (GP), and an Uplink Pilot Time Slot (UpPTS), in which one subframe consists of two slots. The DwPTS is used for initial cell search, synchronization, and channel estimation at a User Equipment (UE). The UpPTS is used for channel estimation and uplink transmission synchronization of the UE at a Base Station (BS). The GP is used to remove interference occurring in uplink due to a multipath delay of a downlink signal between the uplink and a downlink. Meanwhile, one subframe consists of two slots regardless of the radio frame type.

FIG. 3 shows the structure of an LTE downlink slot. As shown in FIG. 3, a signal transmitted in each slot can be described by a resource grid including $N_{RB}^{DL} N_{SC}^{RE}$ subcarriers and $N_{symb}^{DL}$ Orthogonal Frequency Division Multiplexing (OFDM) symbols. Here, $N_{RB}^{DL}$ represents the number of Resource Blocks (RBs) in downlink, $N_{SC}^{RB}$ represents the number of subcarriers constituting one RB, and $N_{symb}^{DL}$ represents the number of OFDM symbols in one downlink slot.

FIG. 4 shows the structure of an LTE uplink slot. As shown in FIG. 4, a signal transmitted in each slot can be described by a resource grid including $N_{RB}^{UL} N_{SC}^{RB}$ subcarriers and $N_{symb}^{UL}$ OFDM symbols. Here, $N_{RB}^{UL}$ represents the number of RBs in uplink, $N_{SC}^{RB}$ represents the number of subcarriers constituting one RB, and $N_{symb}^{UL}$ represents the number of OFDM symbols in one uplink slot.

A Resource Element (RE) is a resource unit defined as an index (a, b) in the uplink slot and the downlink slot and represents one subcarrier and one OFDM symbol. Here, 'a' is an index on a frequency axis and 'b' is an index on a time axis.

In legacy 3GPP LTE, a Reference Signal (RS) pattern of an antenna port 5 is defined as a downlink RS. The RS pattern of the antenna port 5 is named a UE-specific RS. The UE-specific RS may be referred to as a Dedicated Reference Signal (DRS) and a Demodulation Reference Signal (DM-RS) corresponds to the DRS.

An LTE-Advanced (LTE-A) system evolving from the LTE system can improve throughput using a maximum of 8 transmission antennas as compared with 4 transmission antennas in LTE.

To effectively reduce RS overhead, a DRS may be used which is defined in units of RBs of a frequency domain, wherein the DRS is allocated to a UE. The DRS may be precoded and distinguishable patterns corresponding to the number of ranks or layers may be used. 'Distinguishable patterns' mean that the patterns are orthogonal. The DRS need not be precoded.

An RS for supporting backward compatibility and forward compatibility with the LTE system may be defined and an RS of an antenna port 5 of the LTE system may be used as a DRS in terms of reusing the RS.

However, in order to support rank-8 using 8 transmission antennas in an LTE-A system, a maximum of 8 distinguishable DRS patterns should be supported.

It may be difficult to define a maximum of 8 distinguishable DRS patterns by using precoding in an RS pattern of one antenna port 5 and by using multiplexing, such as Code Division Multiplexing (CDM), Frequency Division Multiplexing (FDM), Time Division Multiplexing (TDM), or a combination thereof, in a series of RS sequences. Accordingly, a method for defining a maximum of 8 distinguishable DRS patterns in a system supporting 8 transmission antennas is required.

DETAILED DESCRIPTION OF THE INVENTION

Technical Problems

A technical object to be achieved by the present invention is to provide a method for defining a maximum of 8 distinguishable DRS patterns in a system supporting 8 transmission antennas.

Technical problems to be solved by the present invention are not limited to the above-mentioned technical problems, and other technical problems not mentioned above can be clearly understood by one skilled in the art from the following description.

Means for Solving the Problems

In an embodiment of the present invention to solve the above problems, a method for transmitting data demodulation reference signals in a radio mobile communication system includes generating a subframe including the data demodulation reference signals, and transmitting the generated subframe, wherein a first demodulation reference signal pattern group and a second demodulation reference signal pattern group which include a plurality of orthogonal demodulation reference signal patterns are distinguished from each other in a time-frequency resource, and if a rank is N, M (M≤N) orthogonal demodulation reference signal patterns out of the data demodulation reference signals are included in the first demodulation reference signal pattern group, and N–M orthogonal demodulation reference signal patterns are included in the second demodulation reference signal pattern group.

Each of N and M may correspond to any one integer of 1 to 8.

The M demodulation reference signal patterns included in the first demodulation reference signal group and the N–M reference signal patterns included in the second demodulation reference signal group may be multiplexed using Code Division Multiplexing (CDM).

In another aspect of the present invention, a method for demodulating data of a user equipment in a radio mobile communication system includes receiving a subframe including data and data demodulation reference signals, and demodulating the data using the data demodulation reference signals, wherein a first demodulation reference signal pattern group and a second demodulation reference signal pattern group which include a plurality of orthogonal demodulation reference signal patterns are distinguished from each other in a time-frequency resource, and if a rank is N, M (M≤N) orthogonal demodulation reference signal patterns out of the data demodulation reference signals are included in the first demodulation reference signal pattern group, and N–M orthogonal demodulation reference signal patterns are included in the second demodulation reference signal pattern group.

Each of N and M may correspond to any one integer of 1 to 8.

The M demodulation reference signal patterns included in the first demodulation reference signal group and the N–M reference signal patterns included in the second demodulation reference signal group may be multiplexed using Code Division Multiplexing (CDM).

In a further aspect of the present invention, an apparatus for transmitting data demodulation reference signals in a radio mobile communication system includes a processor for generating a subframe including data and including data demodulation reference signals for demodulating the data, and a transmitter for transmitting the generated subframe, wherein the processor is configured such that a first demodulation reference signal pattern group and a second demodulation reference signal pattern group which include a plurality of orthogonal demodulation reference signal patterns are distinguished from each other in a time-frequency resource, and if a rank is N, M (M≤N) orthogonal demodulation reference signal patterns out of the data demodulation reference signals are included in the first demodulation reference signal pattern group, and N–M orthogonal demodulation reference signal patterns are included in the second demodulation reference signal pattern group.

Each of N and M may correspond to any one integer of 1 to 8.

The M demodulation reference signal patterns included in the first demodulation reference signal group and the N–M reference signal patterns included in the second demodulation reference signal group may be multiplexed using Code Division Multiplexing (CDM).

In still another aspect of the present invention, an apparatus for demodulating data in a radio mobile communication system includes a receiver for receiving a subframe including data and data demodulation reference signals, and a processor for demodulating the data using the data demodulation reference signals, wherein a first demodulation reference signal pattern group and a second demodulation reference signal pattern group which include a plurality of orthogonal demodulation reference signal patterns are distinguished from each other in a time-frequency resource, and if a rank is N, M (M≤N) orthogonal demodulation reference signal patterns out of the data demodulation reference signals are included in the first demodulation reference signal pattern group, and N–M orthogonal demodulation reference signal patterns are included in the second demodulation reference signal pattern group.

Each of N and M may correspond to any one integer of 1 to 8.

The M demodulation reference signal patterns included in the first demodulation reference signal group and the N–M reference signal patterns included in the second demodulation reference signal group may be multiplexed using Code Division Multiplexing (CDM).

Effects of the Invention

According to the present invention, it is possible to transmit a DRS while maintaining compatibility with a legacy system even though the number of antennas increases in a radio communication system.

The effects of the present invention are not limited to the above-mentioned effect, and other effects not mentioned above can be clearly understood by one skilled in the art from the following description.

BEST MODE FOR CARRYING OUT THE INVENTION

Figure 1:
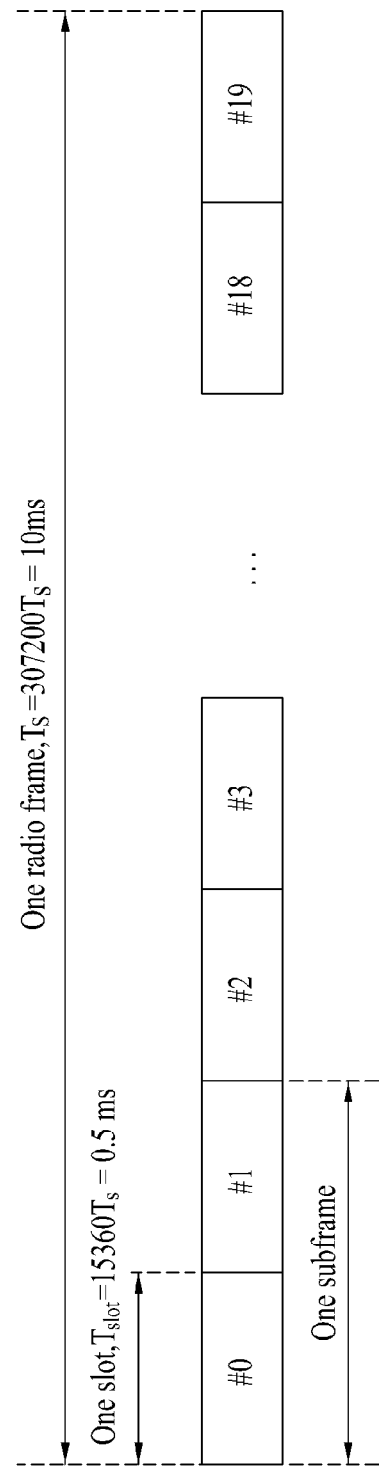
FIG. 1 shows the structure of a Type 1 radio frame.
Figure 2:
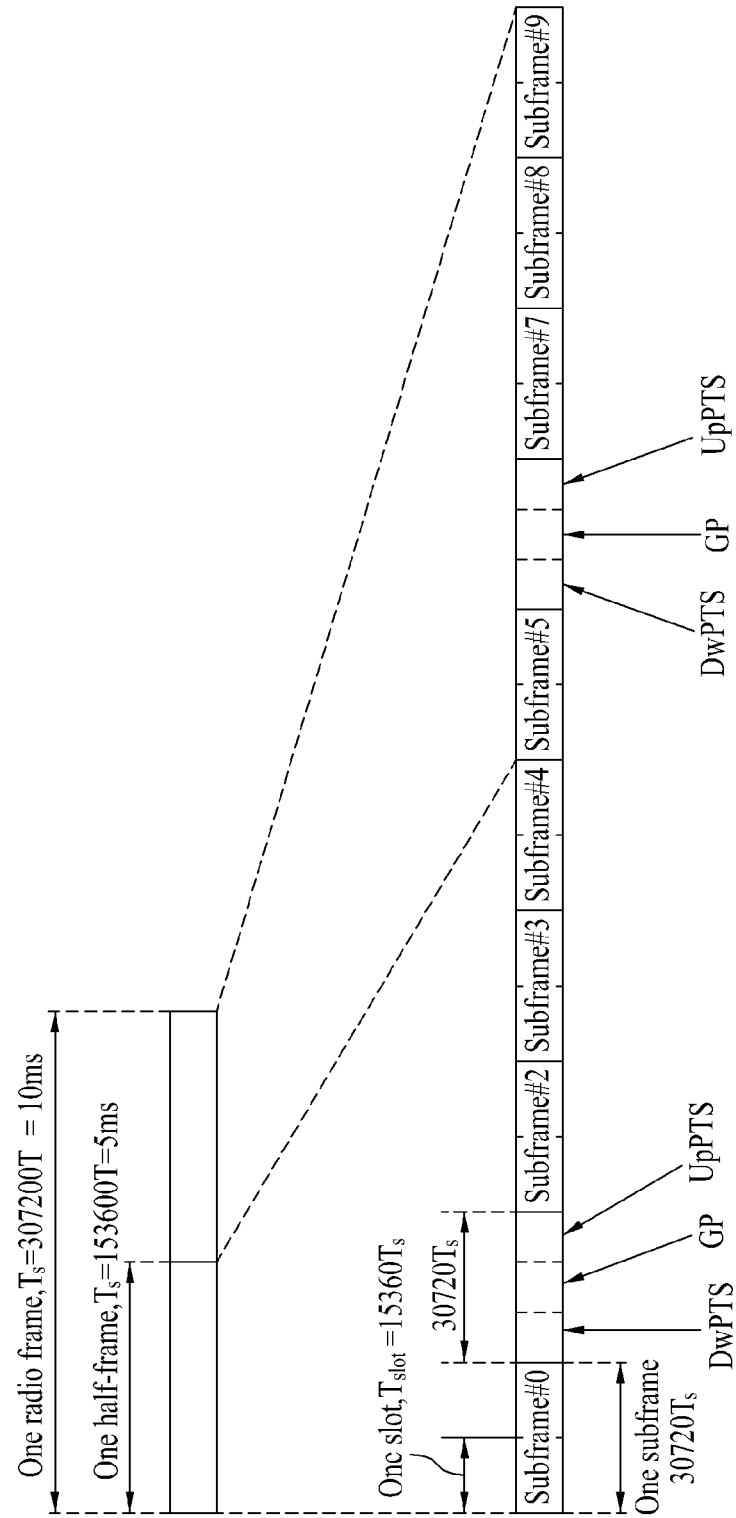
FIG. 2 shows the structure of a Type 2 radio frame.
Figure 3:
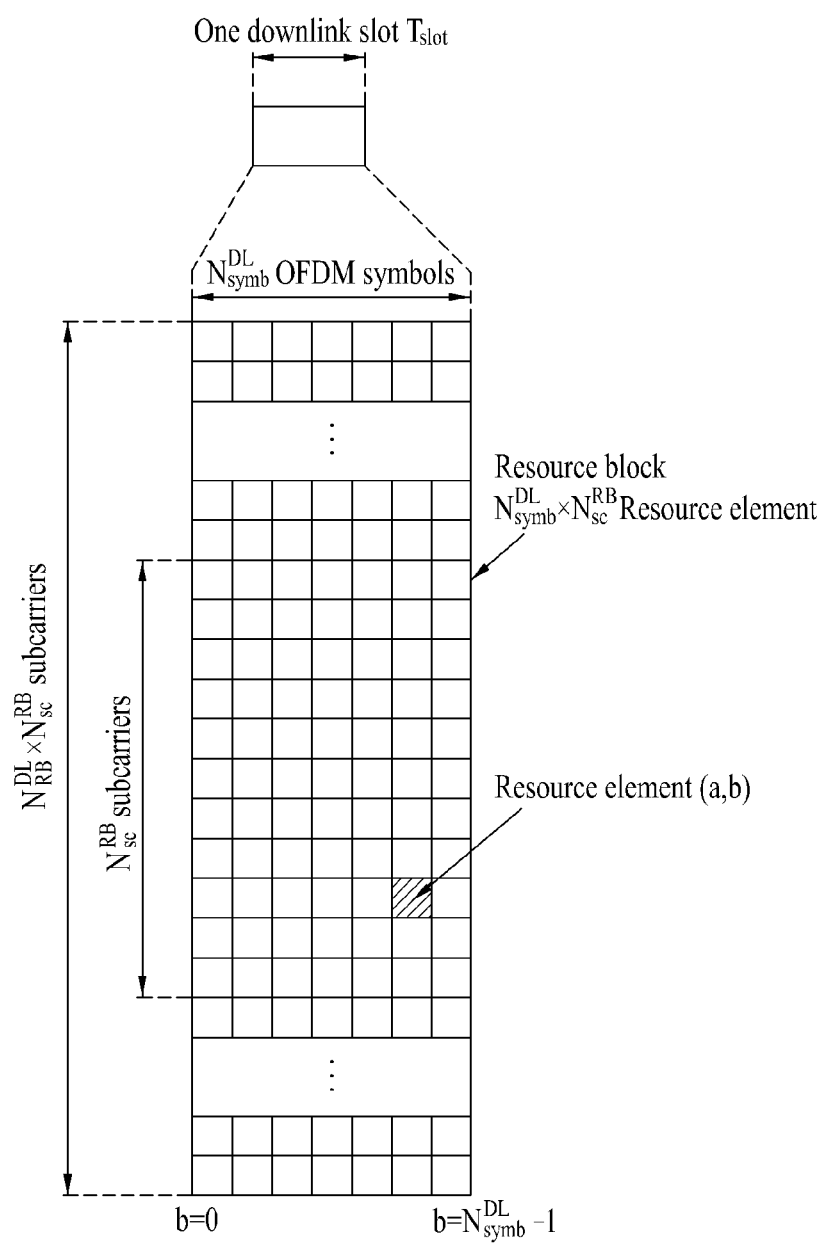
FIG. 3 shows the structure of an LTE downlink slot.
Figure 4:
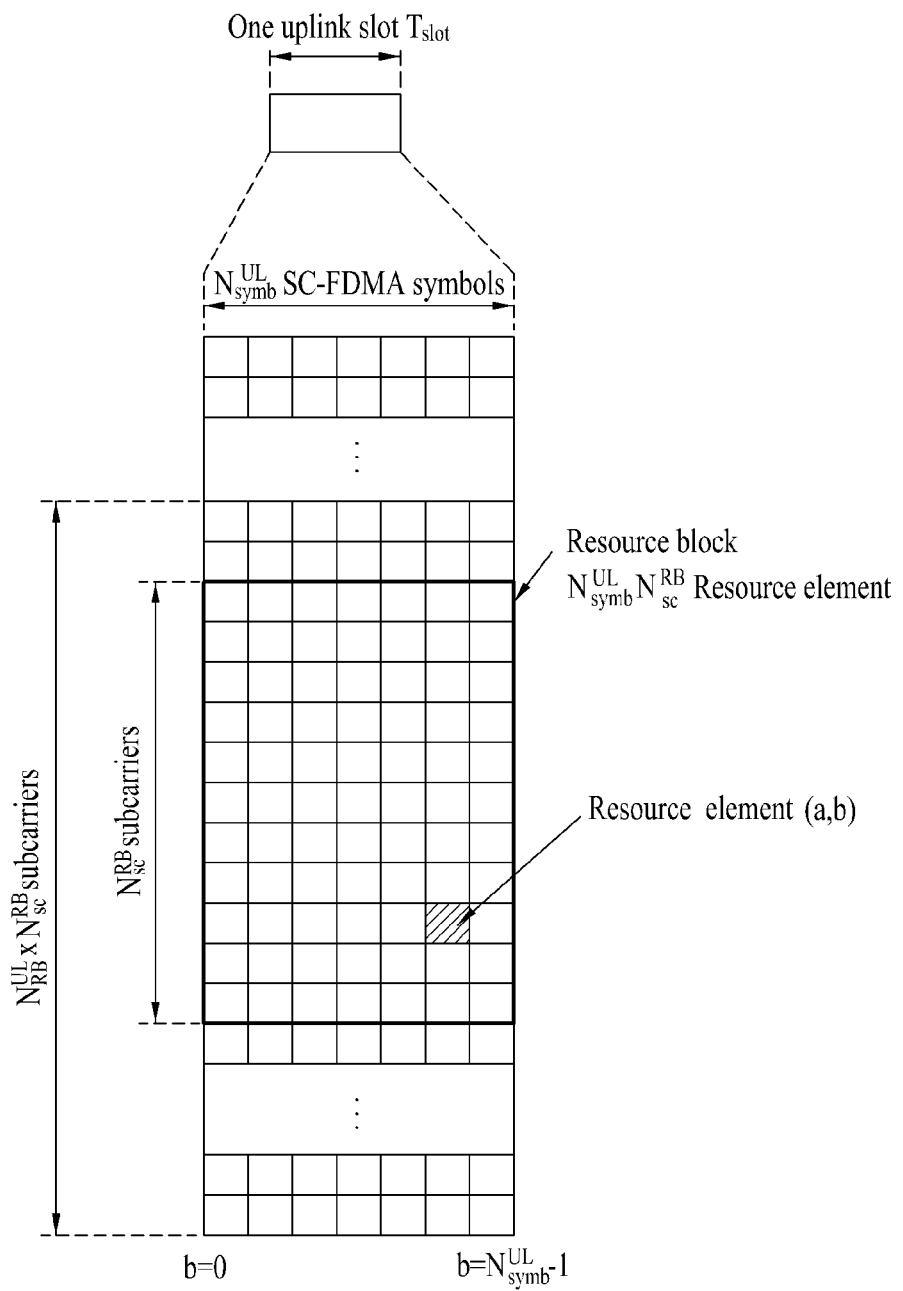
FIG. 4 shows the structure of an LTE uplink slot.

Hereinafter, embodiments of the present invention will be described in detail with reference to the accompanying drawings so that the present invention can be easily realized by those skilled in the art. The present invention can be practiced in various ways and is not limited to the embodiments described herein. In the drawings, parts which are not related to the description are omitted to clearly set forth the present invention and similar elements are denoted by similar reference symbols throughout the specification.

Throughout this specification, when an element is referred to as "including" a component, it does not preclude another component but may further include the other component unless the context clearly indicates otherwise. Also, as used herein, the terms " . . . unit", " . . . device", " . . . module", etc., denote a unit of processing at least one function or operation, and may be implemented as hardware, software, or a combination of hardware and software.

A rank-adaptive DRS may be used by defining, in units of RBs, a specific data DM-RS pattern which is precoded by a transmission PMI for each layer or stream according to a rank value in a transmission mode. Here, a series of orthogonal or quasi-orthogonal code sequences, as well as a pattern in a time-frequency RE, is included in a resource region in which the DM-RS pattern is defined.

Hereinbelow, the present invention proposes multiplexing methods for all DM-RS REs considering patterns for individual layers and overhead for the total number of layers (i.e. rank value), as a detailed configuration method of a DM-RS for each rank. In the following description, the DRS may be understood as the same term as the DM-RS.

A DRS pattern proposed in the present invention may include not only a DRS pattern itself but also all types of patterns which can be configured through cyclic shift in a frequency domain for all patterns expressed through RB grids in all subframes. In addition, the DRS pattern proposed in the present invention may include patterns configured through cyclic shift in an independent frequency domain in an individual OFDM symbol in patterns expressed through RB grids.

To solve the problem mentioned in the above technical problems, the generation of another DRS pattern which is distinguished in a time-frequency resource may be considered. At this time, an RS pattern which is distinguished in a time-frequency resource may be defined as an additional antenna port.

A DRS pattern of an antenna port 5 of a legacy system or a modified DRS pattern is referred to as a DRS pattern group #0 and another DRS pattern which is distinguishably defined in a time-frequency resource is referred to as a DRS pattern group #1.

Assuming that the number of distinguishable DRS patterns, which should be provided in correspondence to an arbitrary rank (a maximum value of a rank is 8) or the number of virtual antenna ports, is N ($1 \leq N \leq 8$), M ($1 \leq M \leq 8$) distinguishable DRS patterns may be multiplexed through a DRS pattern group #0 and (N−M) distinguishable DRS patterns may be multiplexed through a DRS pattern group #1. Here, N is greater than or equal to M.

If there is no distinguishable DRS pattern applicable to a system in an arbitrary DRS pattern group, that is, if M is 0, then the DRS pattern group #0 is not defined in an RB, and if M is equal to N, then the DRS pattern group #1 is not defined in an RB.

Individual layers in an arbitrary rank or virtual antenna ports may be mapped to DRS patterns using a DRS pattern group index first mapping scheme or may be first mapped to DRS patterns of a DRS pattern group #0 and to DRS patterns of a DRS pattern group #1 in the case where the DRS patterns of the DRS pattern group #0 are not sufficient.

A DRS pattern may be adaptively defined by applying a precoding scheme according to rank, used layer, or the number of virtual antenna ports.

The present invention provides detailed embodiments of a combination of all patterns located in REs in a time-frequency RB of two groups in an environment in which a DRS pattern group #0 and a DRS pattern group #1 are simultaneously used.

For optimization in terms of overhead of a DRS pattern group #0, patterns which are modified from an antenna port 5 of a legacy system (e.g. LTE system) having low RS density are proposed.

In the present invention, these modified types of DRS patterns may replace patterns corresponding to a DRS pattern group #0.

Each DRS pattern group may be defined as an antenna port. If a DRS pattern group #0 conforms to a DRS pattern of an antenna port 5 of a legacy system, the DRS pattern group #0 may be set to the antenna port 5 and an RS of a DRS pattern group #1 may be set to another antenna port (e.g. antenna port 6).

Hereinbelow, DRS pattern groups are distinguished from each other by Type X-Y-Z. In Type X-Y-Z, X denotes a pattern design criterion, Y denotes a cyclic shift frequency offset of a DRS pattern group #1 compared with a DRS pattern group #0, and Z denotes a type of Cyclic Prefix (CP) to which a proposed DRS pattern is applied. Z may be expressed as N which denotes a normal CP or E which denotes an extended CP.

Among types proposed below, Type 1 series proposes a DRS pattern group #1 and a DRS pattern group #0 in which a DRS pattern of an antenna port of a legacy system (e.g. LTE system) is shifted by P ($P \geq 1$) OFDM symbols in a time domain and cyclically shifted in units of subcarriers of an arbitrary number in a frequency domain. In the following embodiments, P is set to 1.

Type 2 proposes a DRS pattern group #1 and a DRS pattern group #0 when a modified pattern having the same RS density as in an antenna port 5 of a legacy system is applied.

If collision occurs when all DRS patterns including the proposed DRS pattern group #0 and DRS pattern group #1 and other types of RS patterns for other purposes defined in a system of the present invention are mapped to a time-frequency resource region, RS symbols colliding in the all DRS patterns may be punctured or RS symbols colliding in other types of RS patterns may be punctured.

Embodiment 1

First, a DRS pattern of Type 1 will now be described.

Type 1 has motivation to introduce another DRS pattern group in addition to a DRS pattern group based on an antenna port 5 of a legacy system (e.g. LTE system) in a rank above a prescribed value, and a DRS pattern group #0 and a DRS pattern group #1 may have substantially the same structure as a pattern of the antenna port 5.

Figure 5:
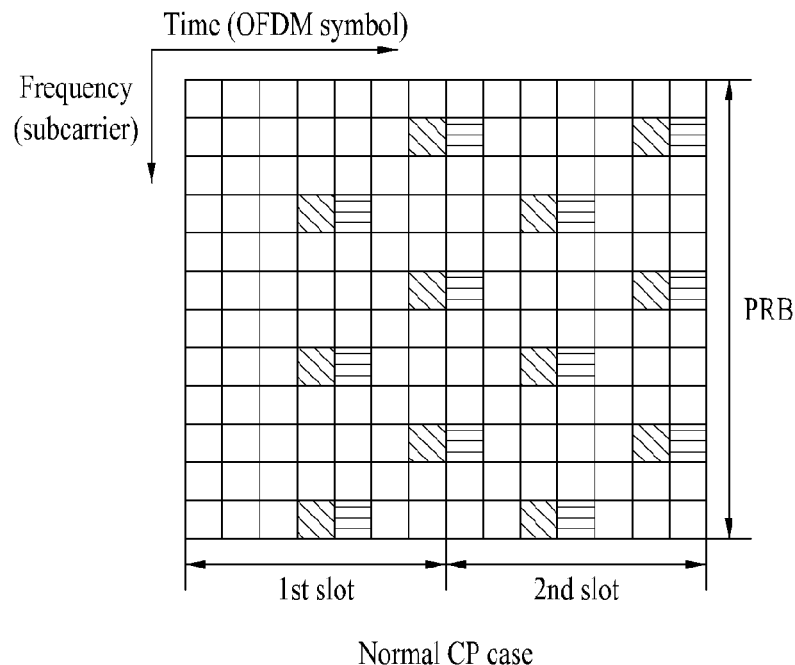
FIG. 5 is a diagram showing DRS patterns of Type 1-0-N and Type 1-0-E for supporting 8 transmission antennas according to a first embodiment of the present invention.
Figure 5:
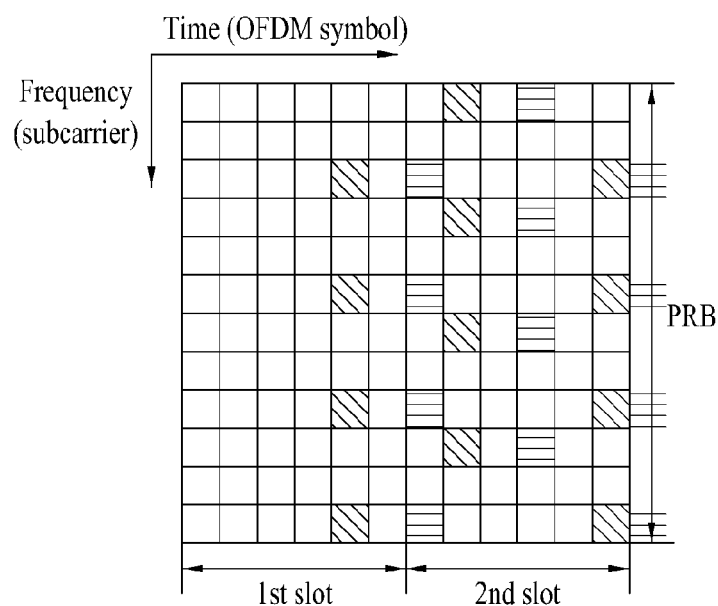

FIG. 5 is a diagram showing DRS patterns of Type 1-0-N and Type 1-0-E for supporting 8 transmission antennas according to a first embodiment of the present invention.

As shown in FIG. 5, since Type 1 corresponds to the cases where P=1 and Y=0, a DRS pattern group #1 is shifted from a DRS pattern group #0 by one symbol in an OFDM symbol axis and is not cyclically shifted in a subcarrier direction.

Figure 6:
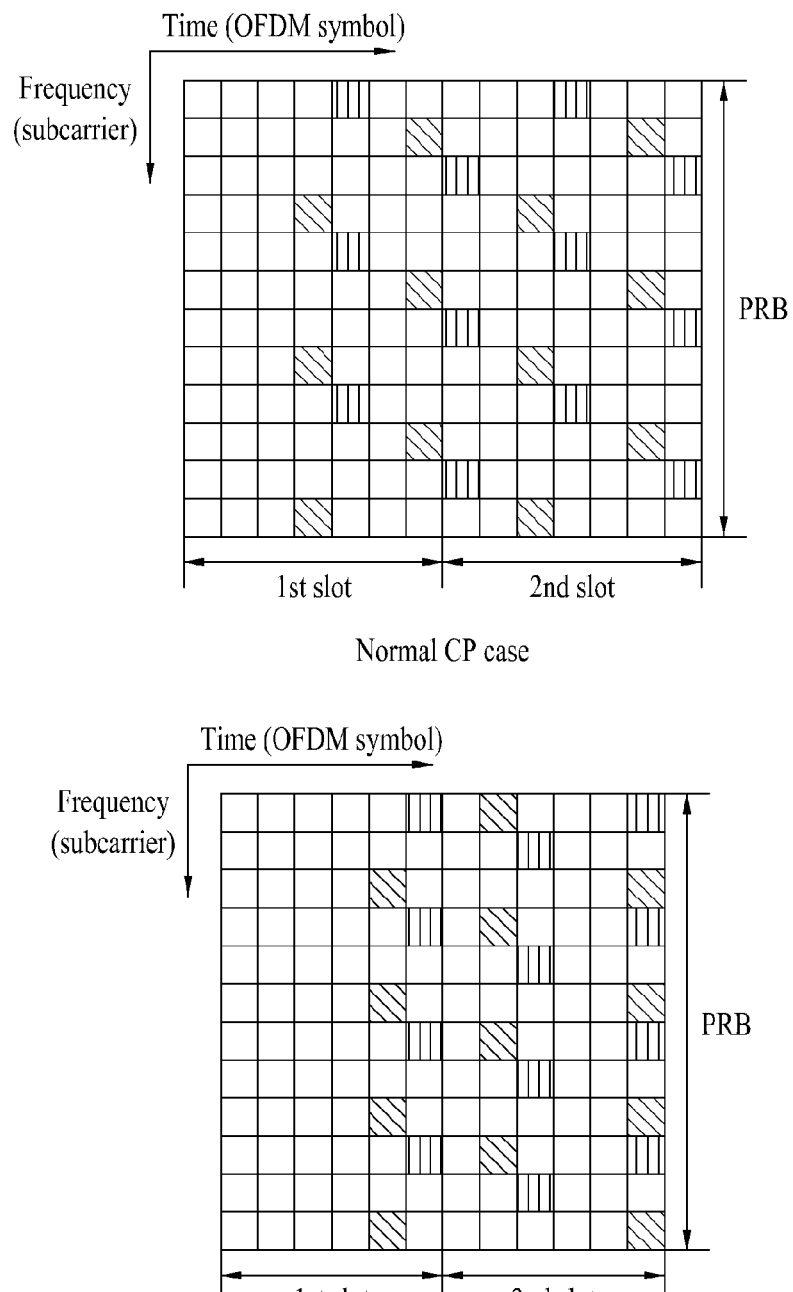
FIG. 6 is a diagram showing DRS patterns of Type 1-0-N and Type 1-0-E for supporting 8 transmission antennas according to the first embodiment of the present invention.

FIG. 6 is a diagram showing DRS patterns of Type 1-0-N and Type 1-0-E for supporting 8 transmission antennas according to the first embodiment of the present invention.

As shown in FIG. 6, since this Type 1 corresponds to the case where P=1 and Y=1, a DRS pattern group #1 is shifted from a DRS pattern group #0 by one symbol in an OFDM symbol axis and is cyclically shifted by one subcarrier in a subcarrier direction.

Figure 7:
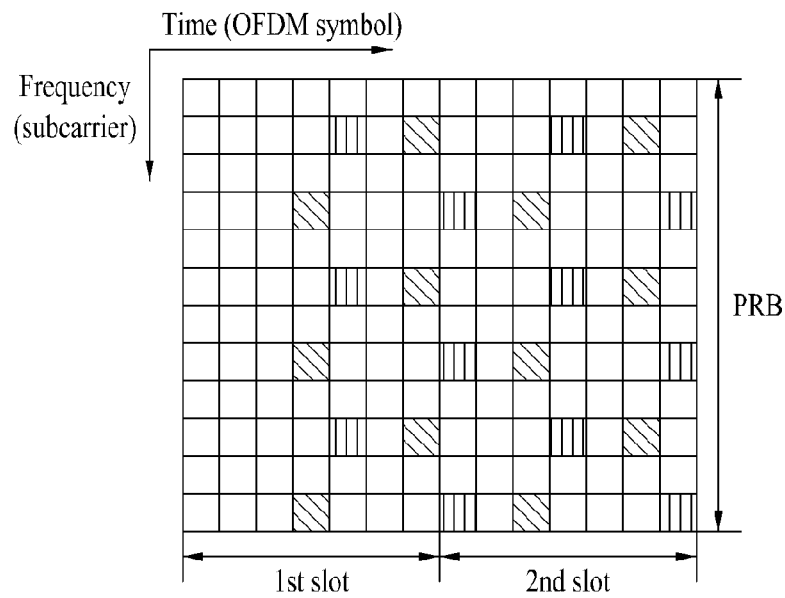
FIG. 7 is a diagram showing DRS patterns of Type 1-2-N and Type 1-2-E for supporting 8 transmission antennas according to the first embodiment of the present invention.
Figure 7:
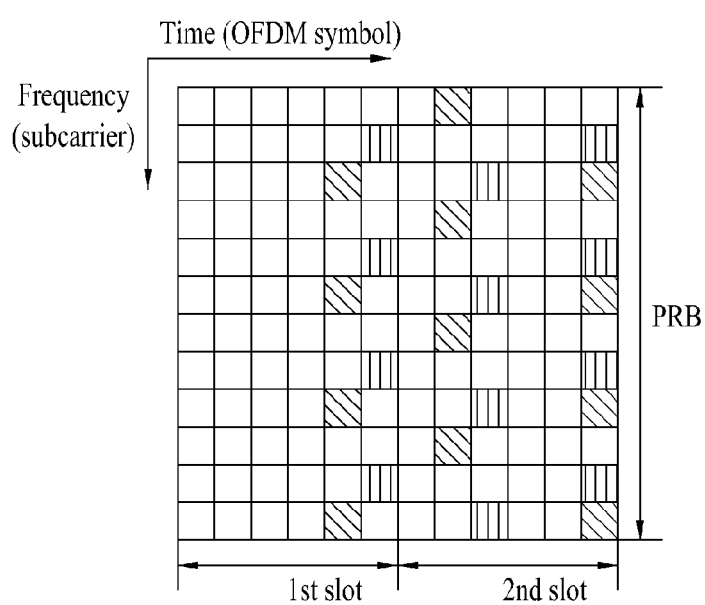

FIG. 7 is a diagram showing DRS patterns of Type 1-2-N and Type 1-2-E for supporting 8 transmission antennas according to the first embodiment of the present invention.

As shown in FIG. 7, since this Type 1 corresponds to the case where P=1 and Y=2, a DRS pattern group #1 is shifted from a DRS pattern group #0 by one symbol in an OFDM symbol axis and is cyclically shifted by two subcarriers in a subcarrier direction.

Figure 8:
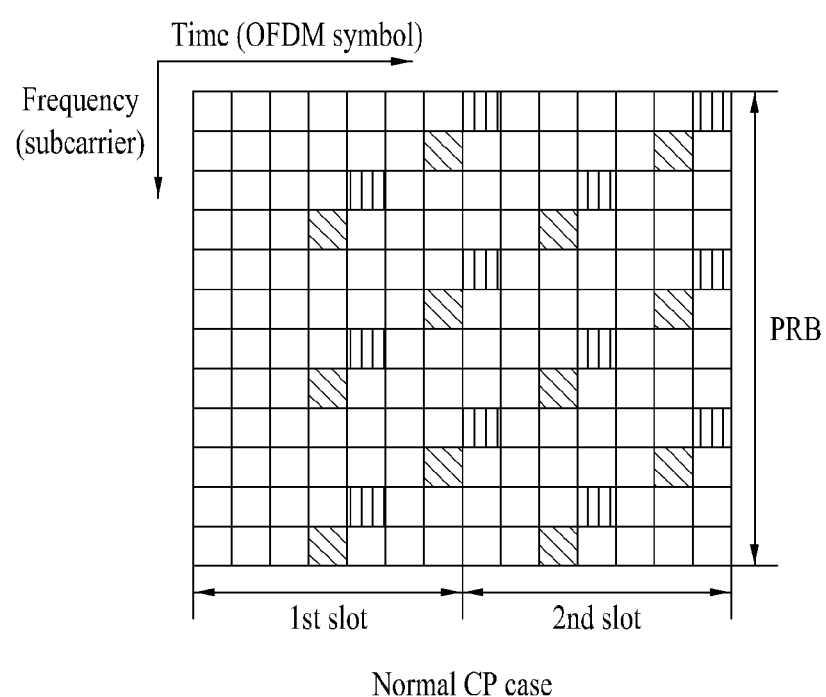
FIG. 8 is a diagram showing DRS patterns of Type 1-3-N and Type 1-3-E for supporting 8 transmission antennas according to the first embodiment of the present invention.

FIG. 8 is a diagram showing DRS patterns of Type 1-3-N and Type 1-3-E for supporting 8 transmission antennas according to the first embodiment of the present invention.

As shown in FIG. 8, since this Type 1 corresponds to the case where P=1 and Y=3, a DRS pattern group #1 is shifted from a DRS pattern group #0 by one symbol in an OFDM symbol axis and is cyclically shifted by three subcarriers in a subcarrier direction.

Embodiment 2

Hereinafter, a DRS pattern of Type 2 will be described.

In Type 2, DRS patterns of the first two OFDM symbols are not shifted and DRS patterns of the other one or two OFDM symbols are cyclically shifted by offset of 1 in a frequency domain in each of the DRS pattern group #0 and DRS pattern group #1 of Type 1.

Figure 9:
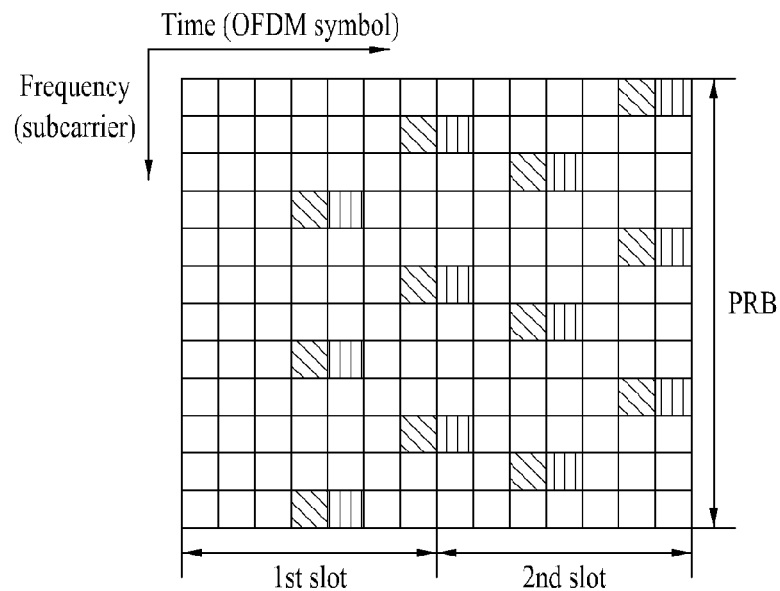
FIG. 9 is a diagram showing DRS patterns of Type 2-0-N and Type 2-0-E for supporting 8 transmission antennas according to a second embodiment of the present invention.
Figure 9:
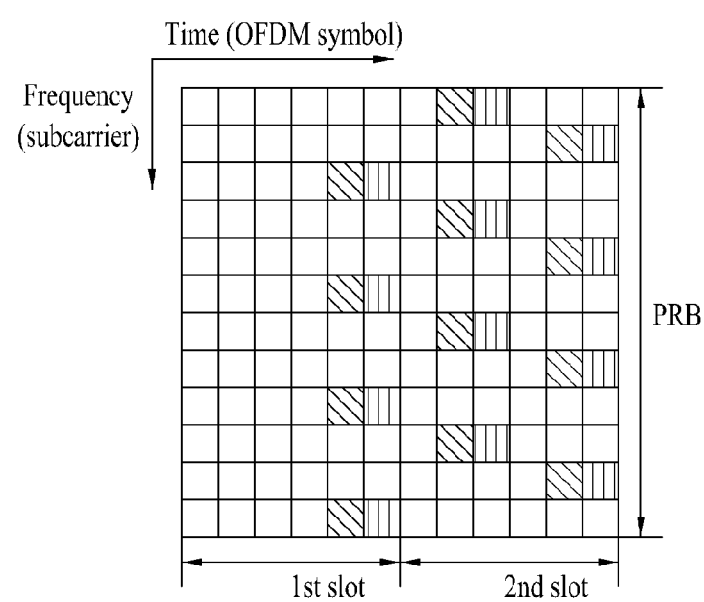

FIG. 9 is a diagram showing DRS patterns of Type 2-0-N and Type 2-0-E for supporting 8 transmission antennas according to a second embodiment of the present invention.

Each of a DRS pattern group #0 and a DRS pattern group #1 of Type 2 of FIG. 9 is configured such that the first two OFDM symbols are not shifted and the other two symbols are shifted by one subcarrier in a frequency axis in each of the DRS pattern group #0 and DRS pattern group #1 of Type 1 of FIG. 5.

Figure 10:
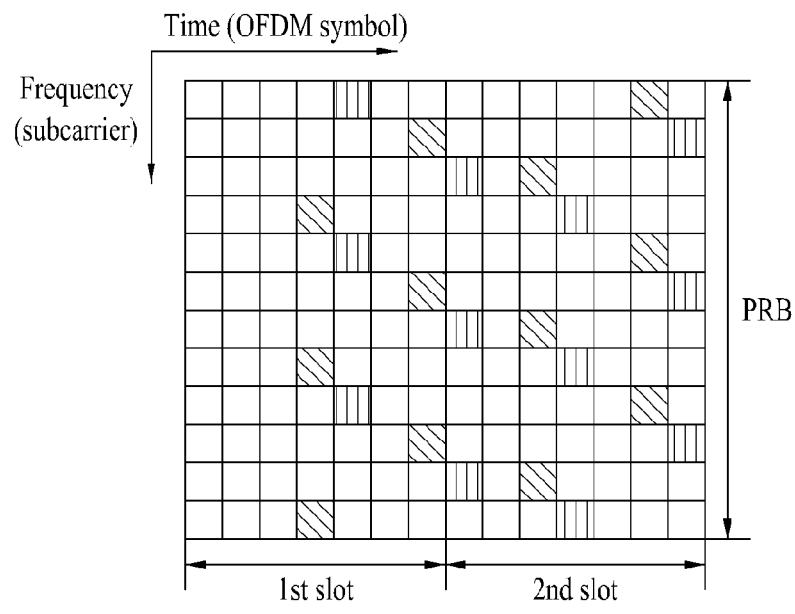
FIG. 10 is a diagram showing DRS patterns of Type 2-1-N and Type 2-1-E for supporting 8 transmission antennas according to the second embodiment of the present invention.
Figure 10:
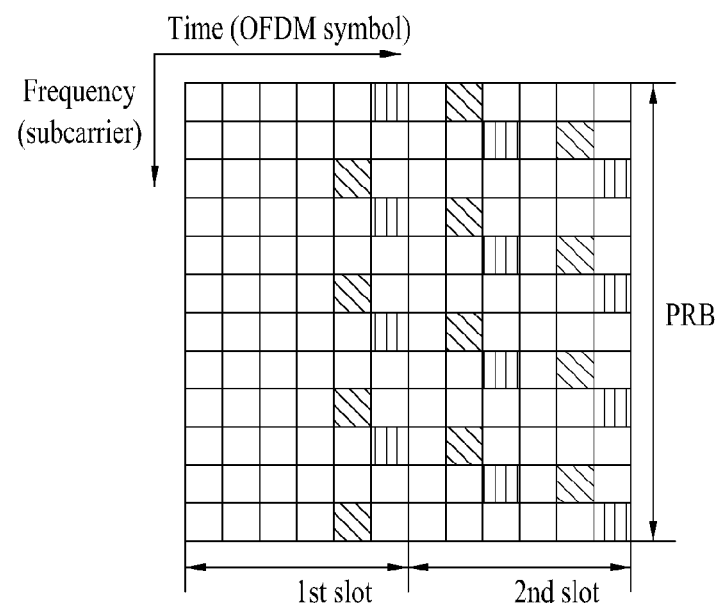

FIG. 10 is a diagram showing DRS patterns of Type 2-1-N and Type 2-1-E for supporting 8 transmission antennas according to the second embodiment of the present invention.

Each of a DRS pattern group #0 and a DRS pattern group #1 of Type 2 of FIG. 10 is configured such that the first two OFDM symbols are not shifted and the other two symbols are shifted by one subcarrier in a frequency axis in each of the DRS pattern group #0 and DRS pattern group #1 of Type 1 of FIG. 6.

Figure 11:
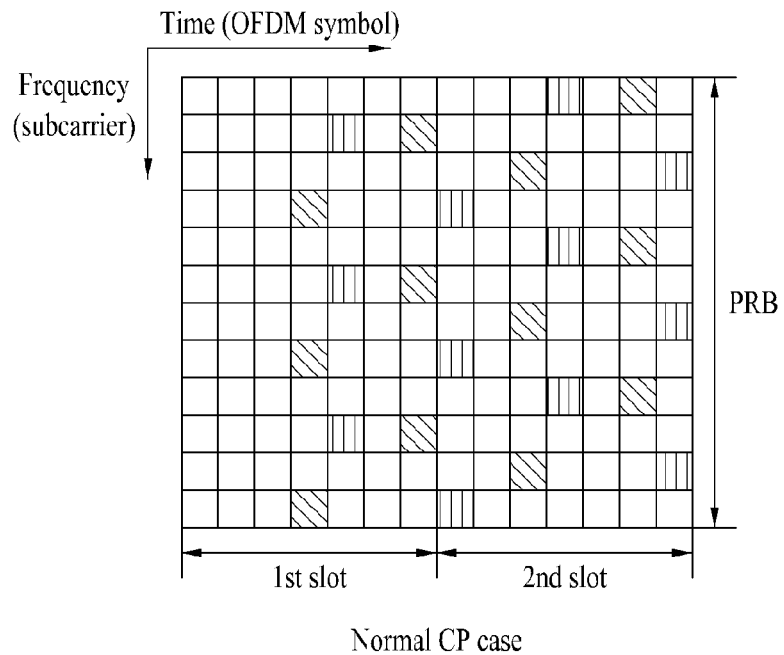
FIG. 11 is a diagram showing DRS patterns of Type 2-2-N and Type 2-2-E for supporting 8 transmission antennas according to the second embodiment of the present invention.
Figure 11:
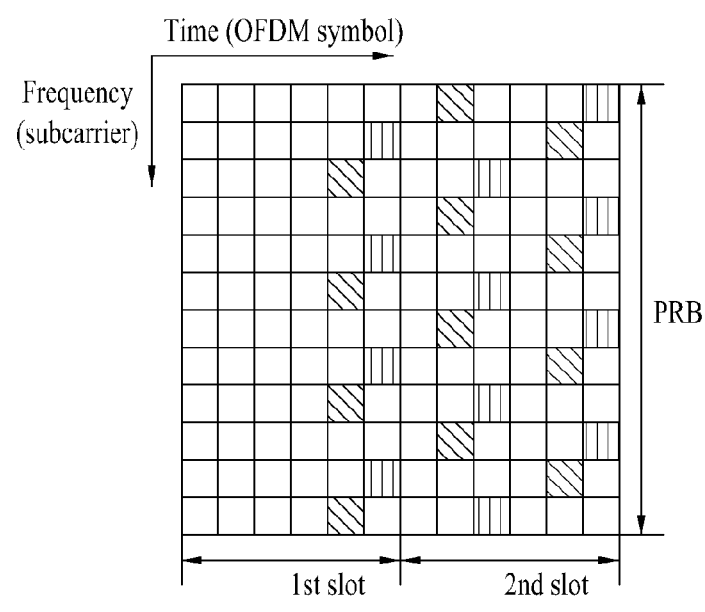

FIG. 11 is a diagram showing DRS patterns of Type 2-2-N and Type 2-2-E for supporting 8 transmission antennas according to the second embodiment of the present invention.

Each of a DRS pattern group #0 and a DRS pattern group #1 of Type 2 of FIG. 11 is configured such that the first two OFDM symbols are not shifted and the other two symbols are shifted by one subcarrier in a frequency axis in each of the DRS pattern group #0 and DRS pattern group #1 of Type 1 of FIG. 6.

Figure 12:
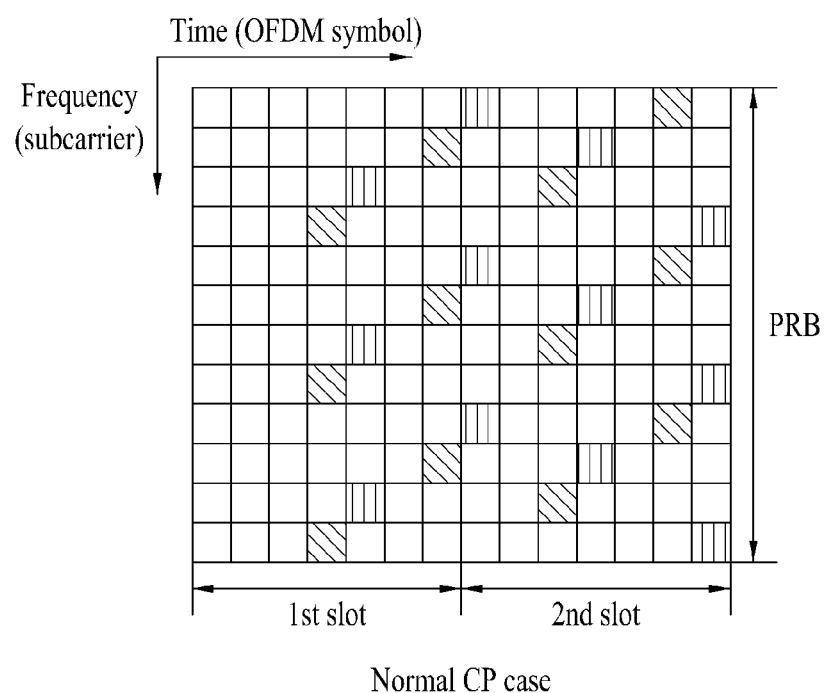
FIG. 12 is a diagram showing DRS patterns of Type 2-3-N and Type 2-3-E for supporting 8 transmission antennas according to the second embodiment of the present invention.

FIG. 12 is a diagram showing DRS patterns of Type 2-3-N and Type 2-3-E for supporting 8 transmission antennas according to the second embodiment of the present invention.

Each of a DRS pattern group #0 and a DRS pattern group #1 of Type 2 of FIG. 12 is configured such that the first two OFDM symbols are not shifted and the other two symbols are shifted by one subcarrier in a frequency axis in each of the DRS pattern group #0 and DRS pattern group #1 of Type 1 of FIG. 6.

Embodiment 3

Meanwhile, for multiplexing distinguishable DRS patterns in an arbitrary DRS pattern group (e.g. DRS pattern group #0 or DRS pattern group #1), CDM may be used.

FIGS. 13 to 17 are diagrams explaining a multiplexing method within a DRS pattern group using CDM or CDM/TDM according to a third embodiment of the present invention.

Although examples shown in FIG. 13 to FIG. 17 have the same RS pattern as in an antenna port 5 of a legacy system, they may be applied to all the cases proposed in the present invention. In FIG. 13 to FIG. 17, PN denotes pseudo noise and OC denotes an orthogonal code.

Figure 13:
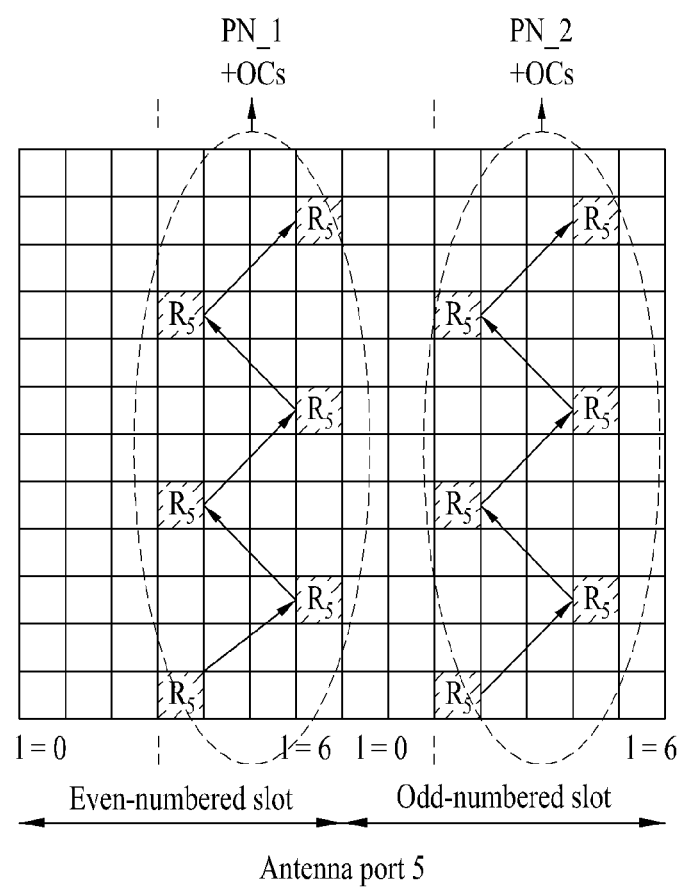
FIGS. 13 to 17 are diagrams explaining a multiplexing method within a DRS pattern group using CDM or CDM/TDM according to a third embodiment of the present invention.
Figure 17:
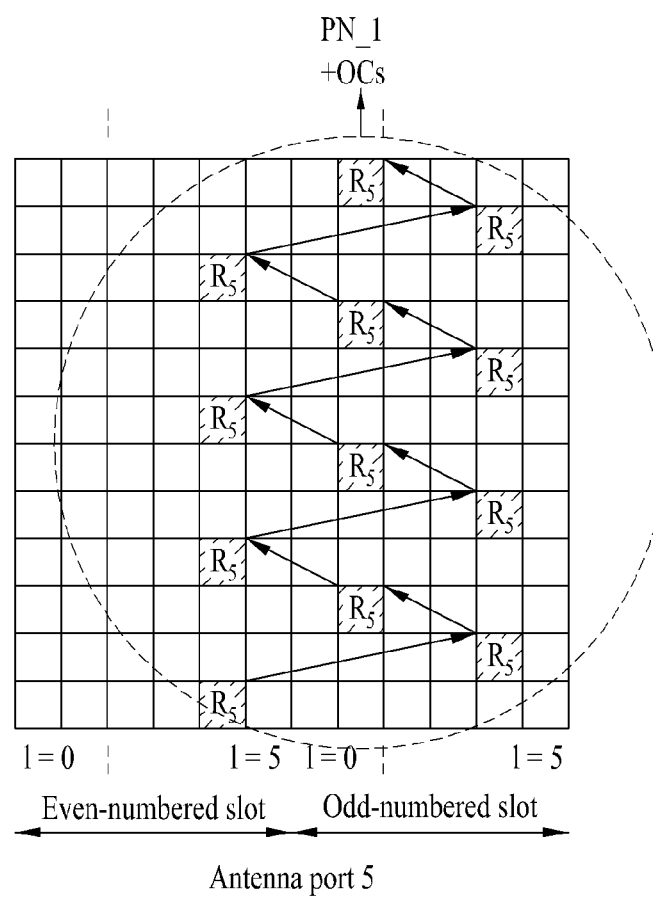

FIG. 13 shows, in a normal CP case, the generation distinguished in the unit of a slot of a CDM orthogonal resource code or scrambling code for a DM-RS defined in a specific PRB in a specific resource region, that is, in an arbitrary downlink subframe. Meanwhile, FIG. 17 shows the same method as in FIG. 13 wherein the method is applied to an extended CP case.

Figure 14:
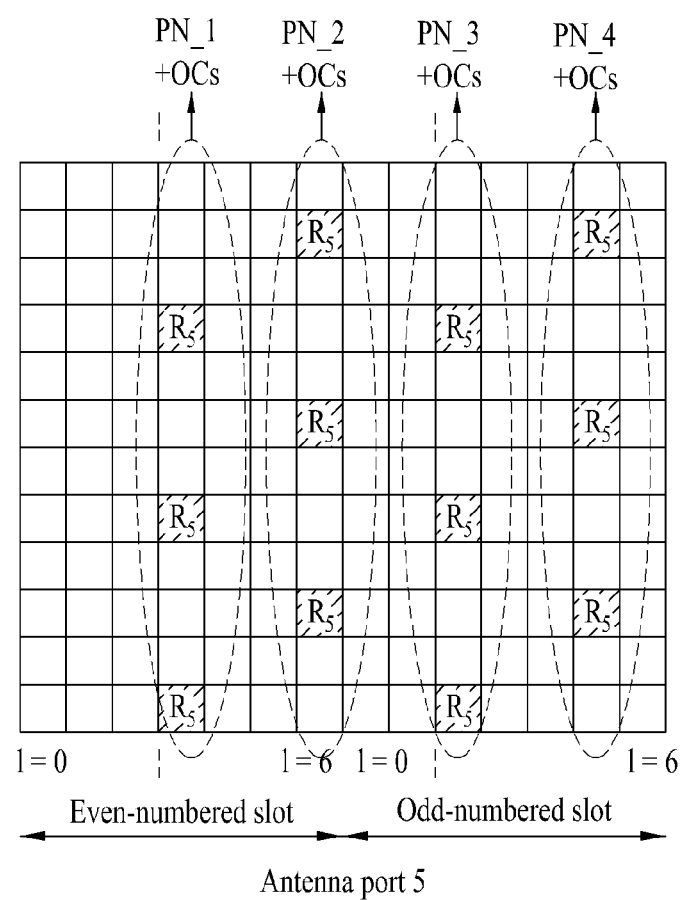
Figure 16:
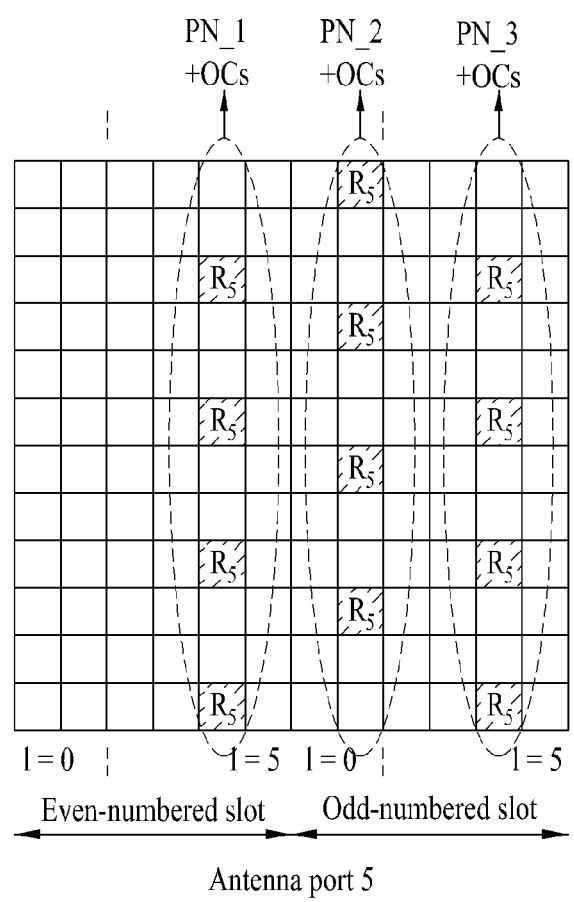

Meanwhile, FIG. 14 shows, in a normal CP case, the generation distinguished by TDM in the unit of one or more symbols of a CDM orthogonal resource code or scrambling code for a DM-RS defined in a specific PRB in a specific resource region, that is, in an arbitrary downlink subframe. FIG. 16 shows the same method as in FIG. 13 wherein the method is applied to an extended CP case.

Figure 15:
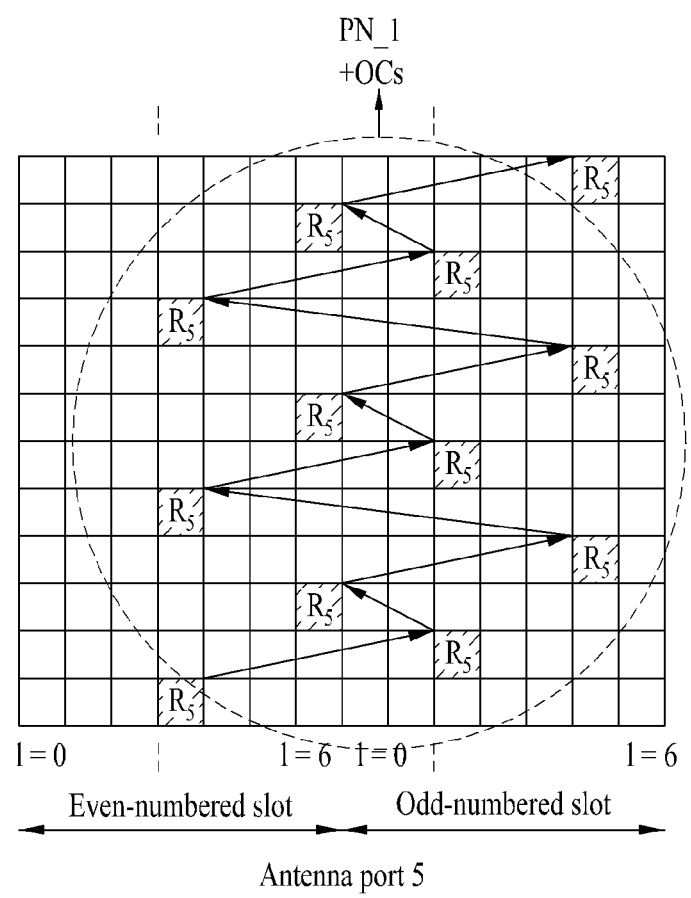

FIG. 15 shows, in a normal CP case, the generation distinguished in the unit of one subframe of a CDM orthogonal resource code or scrambling code for a DM-RS defined in a specific PRB in a specific resource region, that is, in an arbitrary downlink subframe.

Embodiment 4

For rank-1 to rank-3, 12 REs may be used per RB for a DRS pattern, and for rank-4 to rank-8, 24 REs may be used per RB for a DRS pattern. In addition, one of TDM, FDM, and CDM or a combination thereof may be used as a multiplexing method.

First, a method for adding REs for a DRS is described.

A pattern when L=2 is a frequency-shifted version while maintaining the same patterns as all DRS patterns proposed in the present invention when a rank is 1. A method is proposed for allocating a DRS pattern for 12 added REs to the second layer of rank-2 by additionally defining the DRS pattern in a frequency domain in OFDM symbols in which a DRS pattern when a rank is 1 is defined.

The present invention includes cases of all possible values of a frequency shifting offset of the newly additionally defined DRS pattern.

Figure 18:
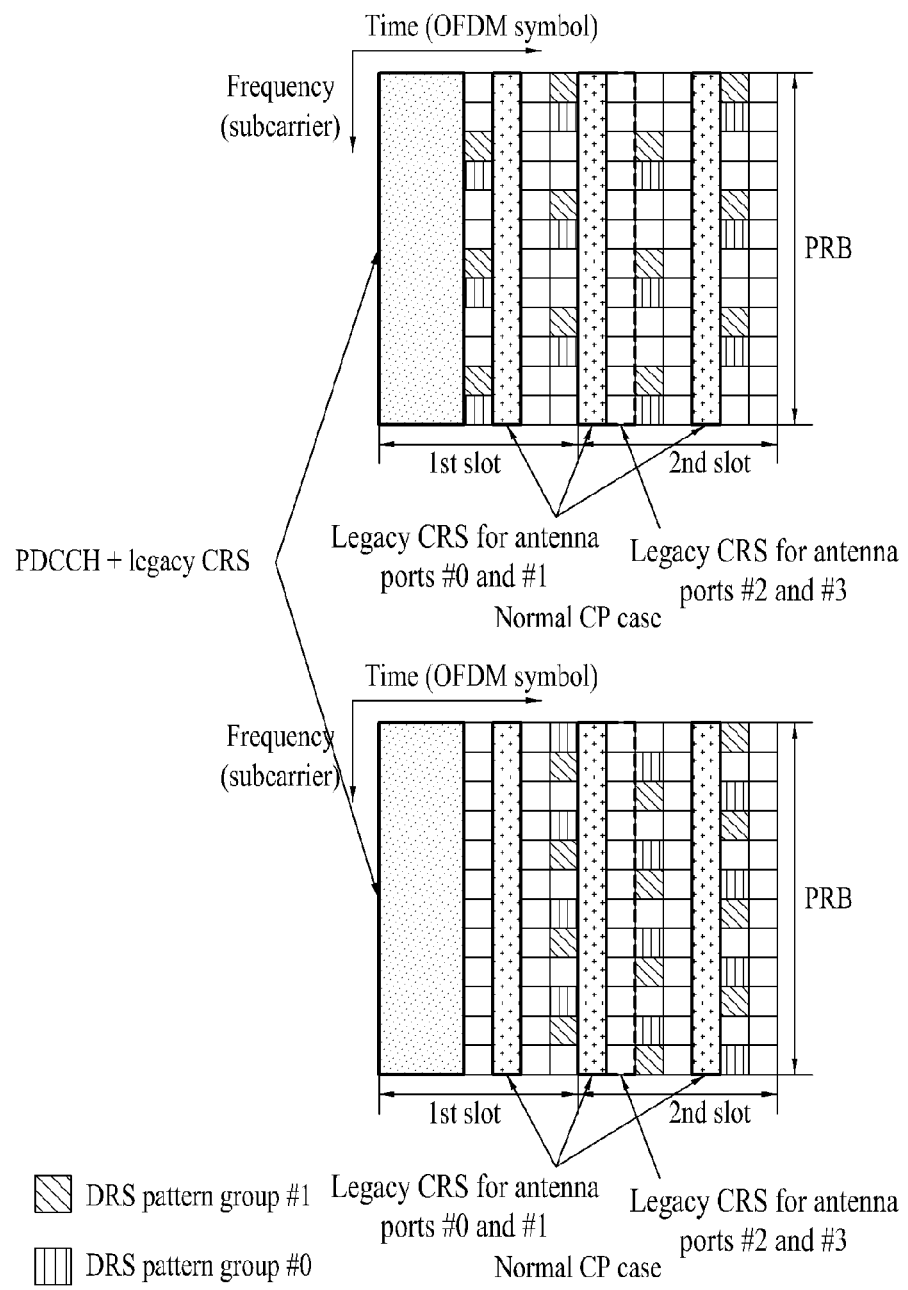
FIGS. 18 and 19 are diagrams showing DRS patterns according to a fourth embodiment of the present invention.
Figure 19:
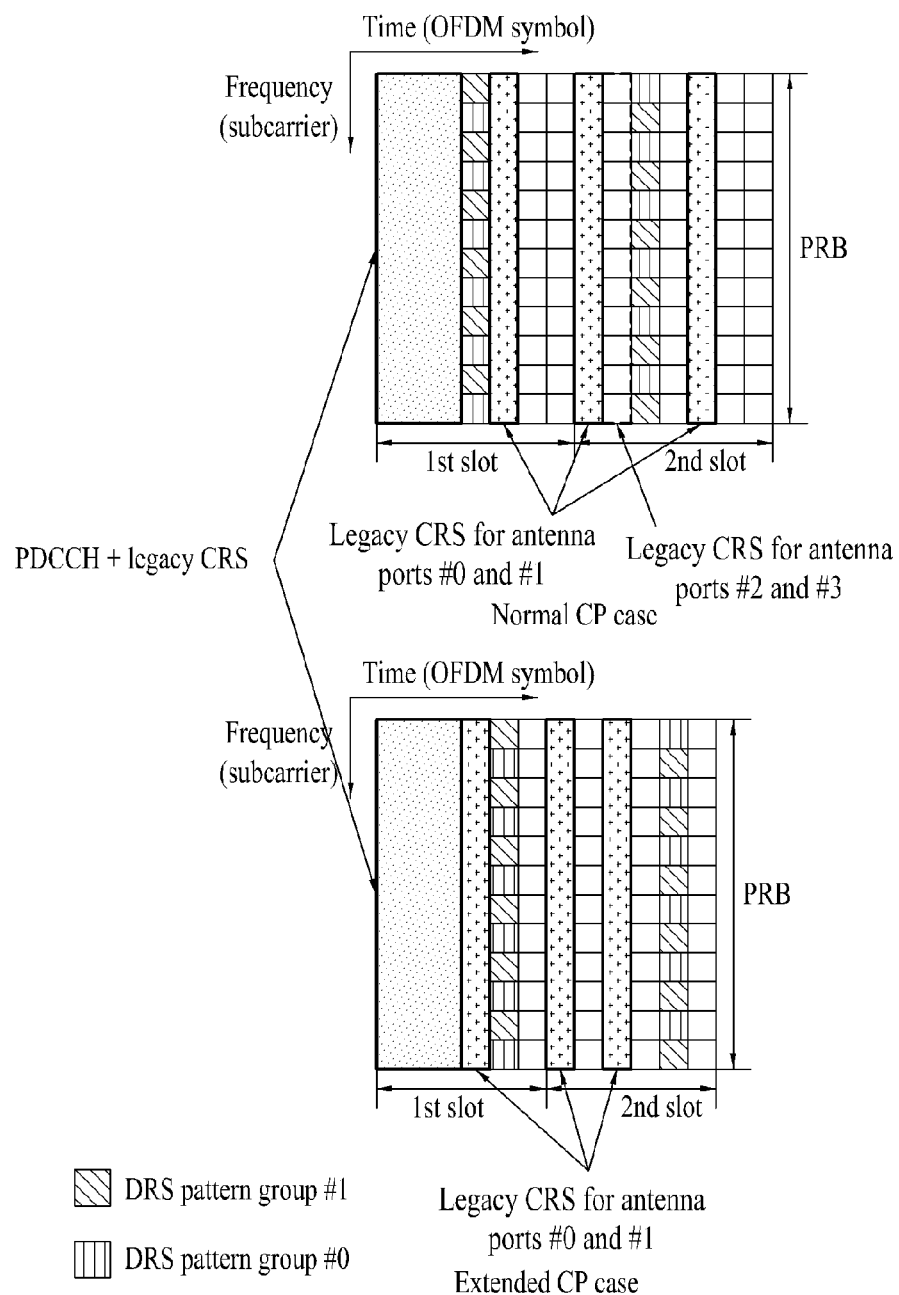
Figure 20:
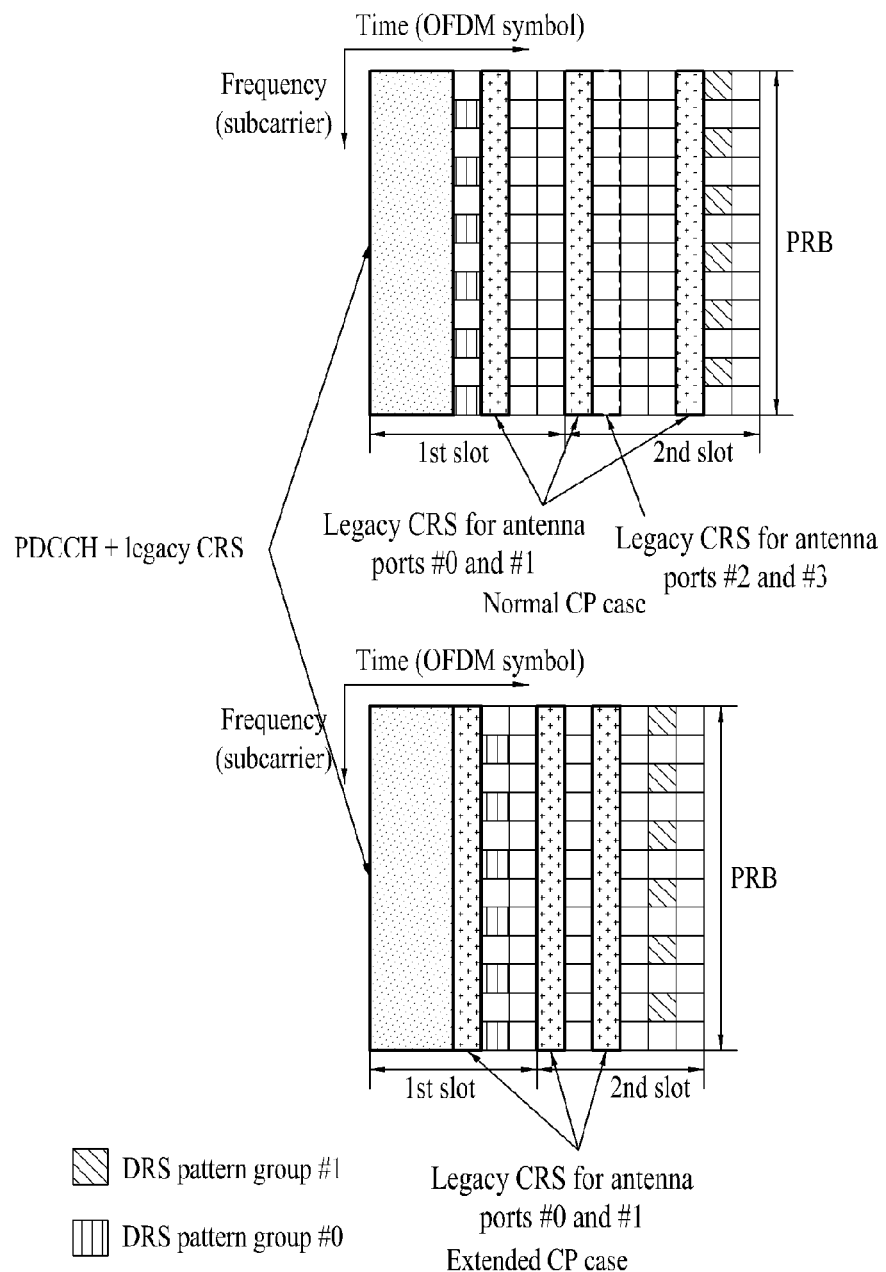
FIGS. 20 to 23 are diagrams showing DRS patterns according to a fifth embodiment of the present invention.
Figure 21:
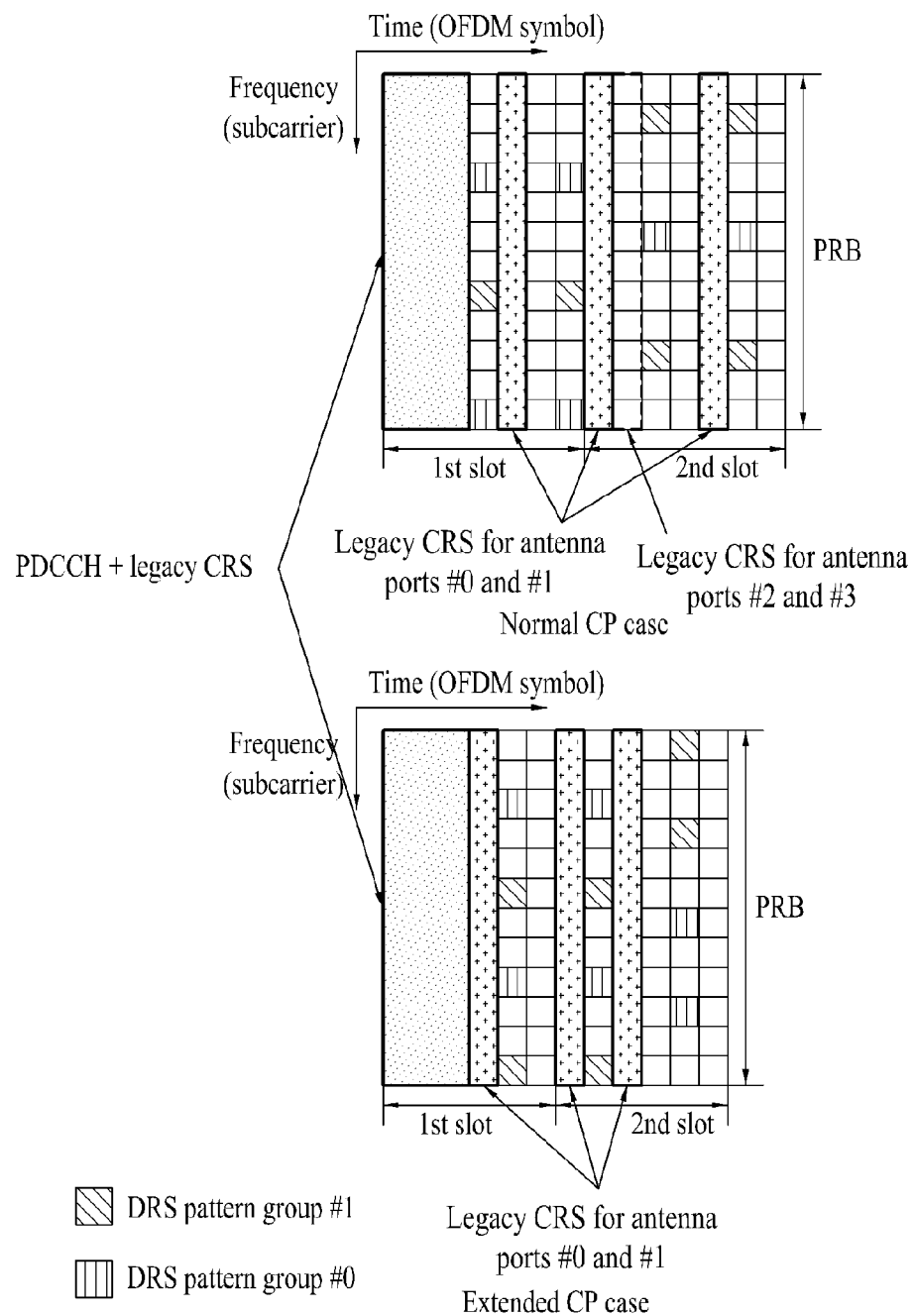
Figure 22:
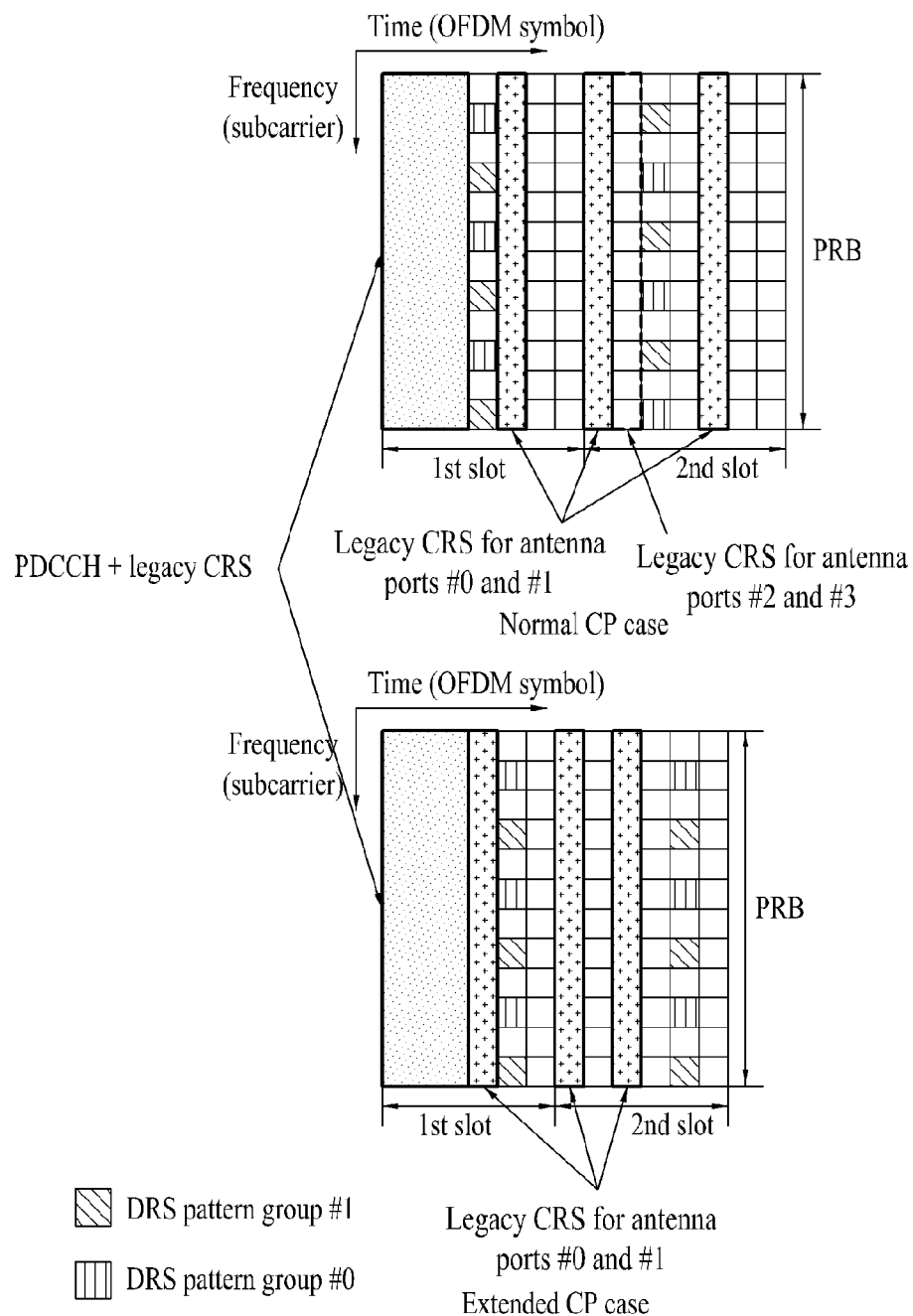
Figure 23:
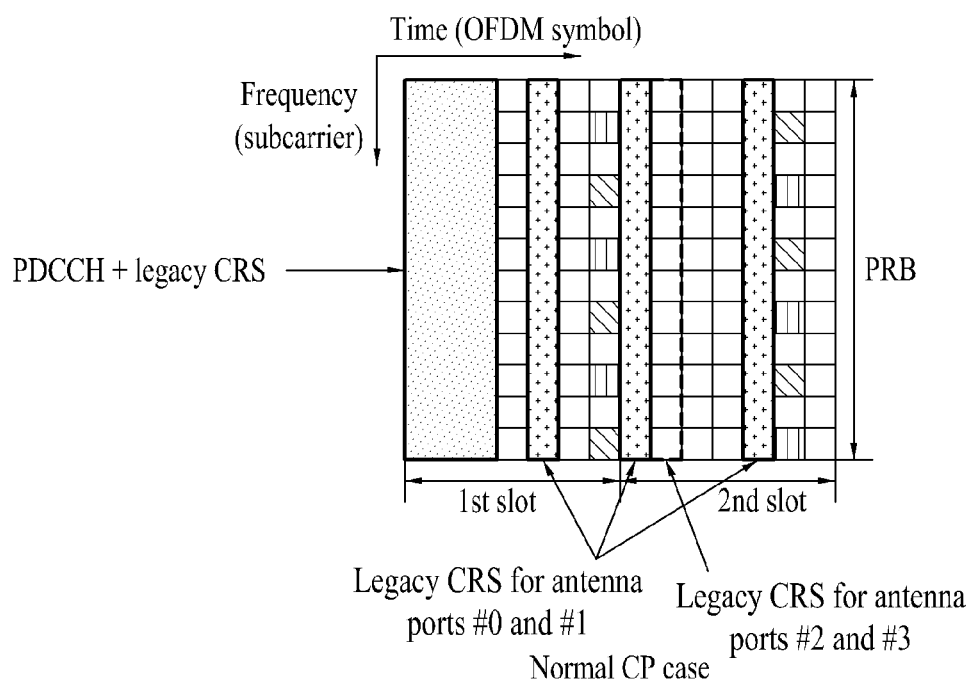

A DRS pattern for 12 added REs may be defined as a DRS pattern allocated for an added layer when a rank is 2 (L=2). Moreover, a total aggregated pattern with respect to all methods proposed in the present invention when a rank is 1 may be divided and allocated according to each layer using one of TDM, FDM, and CDM, or a combination thereof up to rank-N. For layers which should be additionally defined when a rank value is greater than N, a DRS pattern for 12 additional REs proposed in the present invention may be set as the total aggregated pattern and may be divided and allocated according to each layer using one of TDM, FDM, and CDM, or a combination thereof with respect to corresponding layers. FIG. 18 and FIG. 19 are diagrams showing DRS patterns according to a fourth embodiment of the present invention.

Embodiment 5

Meanwhile, when a rank proposed in the present invention is 1, a multiplexing method using one of TDM, FDM, and CDM, or a combination thereof is described.

When L=2, a method is proposed for dividing and allocating the same patterns as all DRS patterns when a rank is 1 proposed in the present invention according to each layer using TDM, FDM, or CDM up to rank-L.

In addition to the above three basic multiplexing methods, combinations of two or more multiplexing methods may be defined as total multiplexing methods.

The method proposed in the present invention includes a normal CP case and an extended CP case.

All proposals of DRS patterns for each layer derived from a multiplexing method proposed in the present invention may be applied as a detailed multiplexing method in total or partial domains of a multiplexing method applied according to an individual pattern of the two DRS patterns of Embodiment 4.

FIGS. 20 to 23 are diagrams showing DRS patterns according to a fifth embodiment of the present invention.

In FIGS. 20 to 23, DRS patterns mapped according to each layer when L=2 are proposed. Indexes of the DRS patterns mapped according to each layer may be mapped in a descending or ascending order.

For the above proposed DRS patterns, individual DRS patterns depicted in the embodiments proposed in the present invention, and/or all DRS patterns on an RB grid, a CDM method may be applied to REs in an arbitrary DRS pattern in a frequency, time, or frequency-time domain using an orthogonal code sequence, such as Walsh, Orthogonal Variable Spreading Function (OVSF), CAZAC (cyclic sequence), Zadoff-Chu (ZC) sequence, or Zadoff-Chu Zero Correlation Zone (ZC-ZCZ) sequence, or a quasi-orthogonal sequence, such as an m-sequence, Gold code, or Kasami sequence.

At this time, the number of used code resources (indicating cyclic shift in case of CAZAC sequence series) is designated within a range which maintains orthogonality in a resource region to which CDM in a radio channel is applied, and the code resources may configure all multiplexing methods in conjunction with a multiplexing method of CDM, TDM, FDM, or TDM/FDM.

Mapping to specific DRS patterns and/or code resources of L individual layers in rank-L may be performed by a time-first, frequency-first, or code-first scheme. In case of a multiplexing method in three resource regions, mapping may be performed in order of time-frequency-code, time-code-frequency, frequency-time-code, frequency-code-time, code-time-frequency, or code-frequency-time.

A UE which receives a subframe including a DRS generated by the above-described methods may demodulate received data using the DRS.

Figure 24:
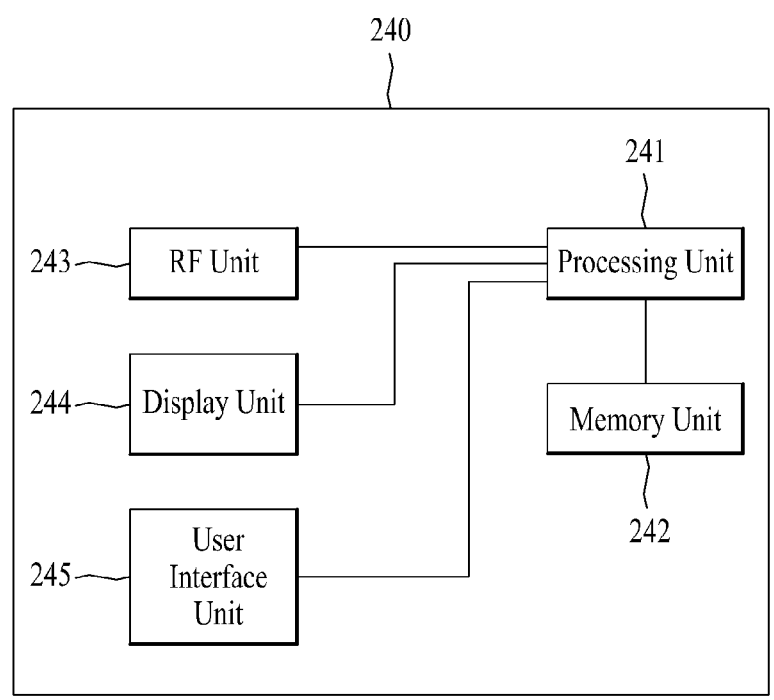
FIG. 24 a block diagram showing the configuration of a device which is applicable to a UE or a BS and through which the above embodiments can be implemented.

FIG. 24 a block diagram showing the configuration of a device which is applicable to a UE or a BS and through which the above embodiments can be implemented. As shown in FIG. 24, a device 240 includes a processing unit 241, a memory unit 242, a Radio Frequency (RF) unit 243, a display unit 244, and a user interface unit 245. A layer of a physical interface protocol is performed in the processing unit 241. The processing unit 241 provides a control plane and a user plane. A function of each layer may be performed in the processing unit 241. The memory unit 242 is electrically connected to the processing unit 241 and stores an operating system, applications, and general files. If the device 240 is a UE, the display unit 244 may display a variety of information and may be achieved using a known Liquid Crystal Display (LCD), an Organic Light Emitting Diode (OLED), etc. The user interface 245 may be configured by combination with a known user interface such as a keypad or a touchscreen. The RF unit 243 is electrically connected to the processing unit 241 and transmits or receives radio signals.

In this specification, the BS means a terminal node of a network, which performs direct communication with a mobile terminal. A specific operation which has been described as being performed by the BS may be performed by an upper node of the BS as the case may be.

In other words, various operations performed for communication with the mobile terminal in a network which includes a plurality of network nodes along with the BS may be performed by the BS, or network nodes other than the BS. The BS may be replaced with the terms such as evolved Node B (eNB), fixed station, Node B, access point, and relay node as an uplink receiving subject.

Also, in the present invention, a mobile terminal corresponds to a User Equipment (UE) and the mobile terminal may be replaced with terms such as Mobile Station (MS), Subscriber Station (SS), Mobile Subscriber Station (MSS), and relay node as an uplink transmitting subject.

MODE FOR CARRYING OUT THE INVENTION

The embodiments according to the present invention can be implemented by various means, for example, hardware, firmware, software, or combination thereof. In a hardware configuration, a method in a radio communication system according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, a method in a radio communication system according to the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

Claims which are not explicitly dependent on each other can be combined to provide an embodiment or new claims can be added through amendment after this application is filed.

INDUSTRIAL APPLICABILITY

The present invention may be used for a UE, a BS, or other devices of a radio mobile communication system.

The invention claimed is:

1. A method for receiving dedicated reference signals (DRSs) in a radio mobile communication system, the method performed by a user equipment (UE) and comprising:
   receiving the DRSs in a resource block; and
   receiving a downlink transmission based on the DRSs in the resource block, wherein:
      the DRSs are mapped for multiple antenna ports of a base station (BS) onto the resource block according to mapping patterns,
      the mapping patterns are classified as a first pattern group and a second pattern group,
      the first pattern group corresponds to at least one antenna port among the multiple antenna ports,
      the second pattern group corresponds to a remaining at least one antenna port among the multiple antenna ports,
      resource element positions of the first pattern group are shifted by 1 subcarrier compared to resource element positions of the second pattern group,
      the first pattern group and the second pattern group are defined in a same resource block,
      the resource element positions of the first pattern group consist of 12 resource elements in the resource block, and
      the resource element positions of the second pattern group consist of other 12 resource elements in the same resource block.

2. The method according to claim 1, wherein:
   the resource element positions of the first pattern group are commonly used for the at least one antenna port among the multiple antenna ports; and
   the resource element positions of the second pattern group are commonly used for the remaining at least one antenna port among the multiple antenna ports.

3. The method according to claim 1, wherein:
   the DRSs of the at least one antenna ports corresponding to the first pattern group are multiplexed using a first set of orthogonal code sequences; and
   the DRSs of the remaining at least one antenna ports corresponding to the second pattern group are multiplexed using a second set of orthogonal code sequences.

4. The method according to claim 1, wherein:
   the resource element positions of the first pattern group are allocated on 4 orthogonal frequency division multiplexing symbols in the downlink subframe; and
   the resource element positions of the second pattern group are allocated on the 4 orthogonal frequency division multiplexing symbols in the downlink subframe.

5. The method according to claim 1, wherein the resource block includes 14 orthogonal frequency division multiplexing symbols and 12 subcarriers.

6. The method according to claim 1, wherein a number of the multiple antenna ports is 3, 4, 5, 6, 7, or 8.

7. A user equipment (UE) for receiving dedicated reference signals (DRSs) in a radio mobile communication system, the UE comprising:
   a receiver; and
   a processor configured to:
      receive the DRSs in a resource block, by using the receiver; and
      receive a downlink transmission based on the DRSs in the resource block, by using the receiver, and
   wherein:
      the DRSs are mapped for multiple antenna ports of a base station (BS) onto the resource block according to mapping patterns,
      the mapping patterns are classified as a first pattern group and a second pattern group,
      the first pattern group corresponds to at least one antenna port among the multiple antenna ports,
      the second pattern group corresponds to a remaining at least one antenna port among the multiple antenna ports,
      resource element positions of the first pattern group are shifted by 1 subcarrier compared to resource element positions of the second pattern group,
      the first pattern group and the second pattern group are defined in a same resource block,
      the resource element positions of the first pattern group consist of 12 resource elements in the resource block, and
      the resource element positions of the second pattern group consist of other 12 resource elements in the same resource block.

8. The UE according to claim 7, wherein:
   the resource element positions of the first pattern group are commonly used for the at least one antenna port among the multiple antenna ports; and
   the resource element positions of the second pattern group are commonly used for the remaining at least one antenna port among the multiple antenna ports.

9. The UE according to claim 7, wherein:
   the DRSs of the at least one antenna ports corresponding to the first pattern group are multiplexed using a first set of orthogonal code sequences; and
   the DRSs of the remaining at least one antenna ports corresponding to the second pattern group are multiplexed using a second set of orthogonal code sequences.

10. The UE according to claim 7, wherein:
    the resource element positions of the first pattern group are allocated on 4 orthogonal frequency division multiplexing symbols in the downlink subframe; and
    the resource element positions of the second pattern group are allocated on the 4 orthogonal frequency division multiplexing symbols in the downlink subframe.

11. The UE according to claim 7, wherein the resource block includes 14 orthogonal frequency division multiplexing symbols and 12 subcarriers.

12. The UE according to claim 7, wherein a number of the multiple antenna ports is 3, 4, 5, 6, 7, or 8.

\* \* \* \* \*